United States Patent [19]

Kobayashi et al.

[11] 4,238,770

[45] Dec. 9, 1980

[54] VERTICAL SYNCHRONIZING SIGNAL DETECTOR CIRCUIT

[75] Inventors: Masaharu Kobayashi; Takao Arai; Takashi Hoshino; Hiroyuki Kimura; Keizo Nishimura, all of Yokohama, Japan

[73] Assignee: Hitachi, Ltd., Japan

[21] Appl. No.: 79,252

[22] Filed: Sep. 27, 1979

[30] Foreign Application Priority Data

Sep. 27, 1978 [JP] Japan .................. 53-117934

[51] Int. Cl.³ .......................................... H04N 5/10
[52] U.S. Cl. .................... 358/154; 358/158
[58] Field of Search ............... 358/158, 154; 328/139; 360/38

[56] References Cited

U.S. PATENT DOCUMENTS 3,532,810  10/1970  Steinberg ...................... 358/154

Primary Examiner—John C. Martin
Attorney, Agent, or Firm—Craig and Antonelli

[57] ABSTRACT

There is disclosed a vertical synchronizing signal detector circuit for use with a PCM recording/reproducing system which records and reproduces audio signals with pulse code modulation by the use of a home VTR system or a part thereof. The vertical synchronizing signal detector circuit comprises an input terminal for receiving a composite synchronizing signal including a horizontal synchronizing signal and a vertical synchronizing signal, an output terminal for providing a vertical synchronizing pulse synchronized with the vertical synchronizing signal, a clock pulse generator circuit connected to the input terminal and adapted to generate a clock pulse having half the period of the horizontal synchronizing signal and a phase lag therefrom of one-fourth the period thereof, a vertical synchronizing signal extractor circuit connected to the input terminal and the clock pulse generator circuit and adapted to compare the vertical synchronizing signal with a reference waveform pattern for the vertical synchronizing signal so as to generate a vertical synchronizing signal output synchronized with the vertical synchronizing signal only when the comparison results in a complete coincidence, and a vertical synchronizing signal compensator circuit connected to the vertical synchronizing signal extractor circuit and the clock pulse generator circuit and responsive to the vertical synchronizing signal output to provide this output at the output terminal and simultaneously store the same temporarily, the vertical synchronizing signal compensator circuit being also adapted to provide the stored vertical synchronizing signal output at the output terminal when the vertical synchronizing signal output is not received, whereby the vertical synchronizing pulse is produced at correct timing even if the vertical synchronizing signal is absent in the composite synchronizing signal because of a dropout or the like.

6 Claims, 7 Drawing Figures

VERTICAL SYNCHRONIZING SIGNAL DETECTOR CIRCUIT

BACKGROUND OF THE INVENTION

This invention relates to a vertical synchronizing signal detector circuit, and more particularly to a vertical synchronizing signal detector circuit for use in a PCM recording/reproducing system which may record and reproduce an audio signal with pulse code modulation by using a home VTR system or a part thereof, in accordance with EIAJ Technical File STC-077, Home PCM Encorder/Decorder.

The conventional vertical synchronizing signal detection has been effected either by detecting the envelope wave obtained by integrating a vertical synchronizing signal as used in a television receiver and so forth or by extracting the features of a vertical synchronizing signal such as its pulse width, period, etc.

With such a conventional method alone, however, a drop-out or the like may cause the synchronizing signal to be out of timing. In a PCM recording/reproducing system with a video tape recorder, data will be discontinous if a timing error of the synchronizing signal exceeds the length of a whole horizontal period. With a method wherein left-channel data, right-channel data and corrective data at the same instant are recorded separately with each other, an error correction can be made when the data in either channel are in error, but the discontinuity of data due to the above-mentioned timing error of the synchronizing signal will cause an erroneous correction for data during the error correction.

SUMMARY OF THE INVENTION

It is an object of the invention to provide a vertical synchronizing signal detector circuit which may detect a vertical synchronizing signal without any timing error by eliminating disadvantages of the prior art.

In accordance with the present invention, there is provided a vertical synchronizing signal detector circuit which comprises an input terminal for receiving a composite synchronizing signal including a horizontal synchronizing signal and a vertical synchronizing signal, an output terminal for providing a vertical synchronizing pulse synchronized with the vertical synchronizing signal, a clock pulse generator circuit connected to the input terminal and adapted to generate a clock pulse having half the period of the horizontal synchronizing signal and a phase lag therefrom of one-fourth the period thereof, a vertical synchronizing signal extractor circuit connected to the input terminal and the block pulse generator circuit and adapted to compare the composite synchronizing signal with a reference pattern for the vertical synchronizing signal thereby to generate the vertical synchronizing signal output synchronized with the synchronizing signal only when the comparison results in a complete coincidence, and a vertical synchronizing signal compensator circuit responsive to the vertical synchronizing signal output from the vertical synchronizing signal extractor circuit to provide an output at the output terminal and simultaneously store it temporarily, the vertical synchronizing signal compensator circuit being also adapted to provide the stored vertical synchronizing signal output at the output terminal when the vertical synchronizing signal output is not received.

DESCRIPTION OF THE PREFERED EMBODIMENT

Figure 1:
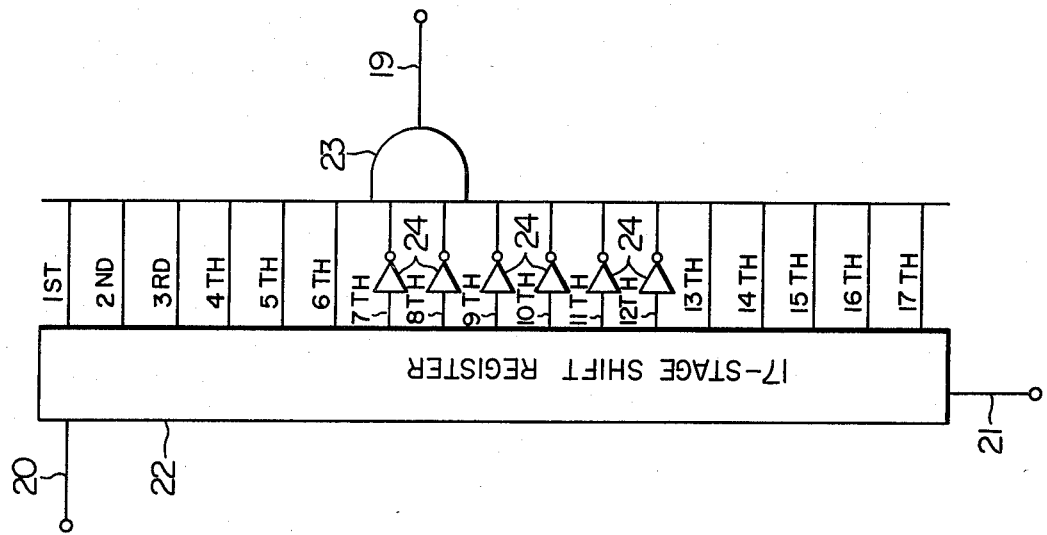
FIG. 1 is a block diagram showing schematically a vertical synchronizing signal detector circuit according to the present invention.

This invention is now described in detail by way of one embodiment thereof shown in the accompanying drawings. FIG. 1 is a block diagram which generally illustrates a vertical synchronizing signal detector circuit according to the present invention. In FIG. 1, reference numeral 1 designates an arrangement of the vertical synchronizing signal detector circuit which comprises a vertical synchronizing signal extractor circuit 2, a vertical synchronizing signal compensator circuit 3 and a clock pulse generator circuit 4. The clock pulse generator circuit 4 receives from an external composite synchronizing signal source 5 such as a sync separator, a composite synchronizing signal 20 including a horizontal synchronizing signal and a vertical synchronizing signal, and generates a clock pulse 21 having half the period of the horizontal synchronizing signal or ½ $T_H$ ($T_H$ represents the period of the horizontal synchronizing signal.) and a phase lag therefrom of one-fourth the period thereof. The clock pulse 21 is wave-shaped by a multivibrator (not shown) in the clock pulse generator in such a manner that its pulse width is 1 microsecond. The vertical synchronizing signal extractor circuit 2, whose circuit arrangement will be described later, receives the composite synchronizing signal 20 and the clock pulse 21. The composite synchronizing signal 20 is admitted into the vertical synchronizing signal extractor circuit 2 in accordance with the clock pulse, and the circuit 2 compares the composite synchronizing signal 20 with a reference waveform pattern of the vertical synchronizing signal and generates a vertical synchronizing signal output 19 only when the comparison results in a complete coincidence. The vertical synchronizing signal compensator circuit 3, whose circuit arrangement will be described later, receives simultaneously the vertical synchronizing signal output 19 from the vertical synchronizing signal extractor circuit 2 and the clock pulse 21. When the vertical synchronizing signal output 19 is present, this circuit 2 produces a vertical synchronizing pulse 8 synchronized with the vertical synchronizing signal included in the composite synchronizing signal 20 and stores the vertical synchronizing signal output 19 temporarily. In the absence of the vertical synchronizing signal output 19, the stored vertical synchronizing signal output 19 is extracted from the circuit 2 in synchronism with the vertical synchronizing signal included in the composite synchronizing signal 20. Thus, the vertical synchronizing signal detector circuit according to the present invention enables a continuous reproduction of the vertical synchronizing signal even if the vertical synchronizing signal included in the composite synchronizing signal 20 is missed by some reasons such as a dropout which may be caused by scratches or dust particles on the magnetic tape surface.

Figure 2:
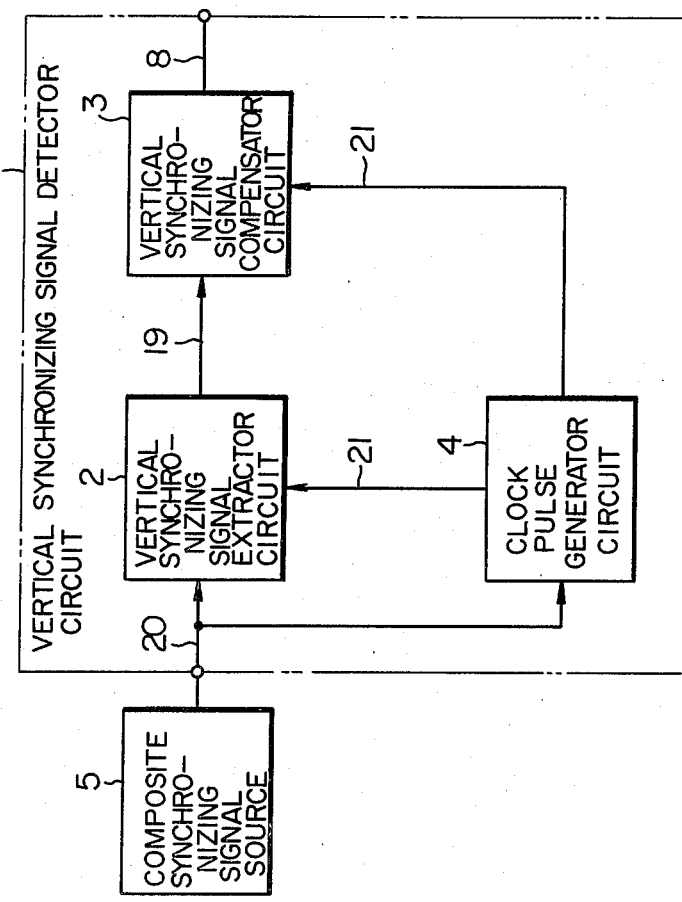
FIG. 2 is a block diagram showing one embodiment of a vertical synchronizing signal extractor circuit in the vertical synchronizing signal detector circuit according to the present invention.

Next, one embodiment of the vertical synchronizing signal extractor circuit according to the present invention is described with reference to FIG. 2. In FIG. 2, reference numerals 22, 23 and 24 designate a 17-stage shift registor, an AND gate and inverters, respectively. The composite synchronizing signal 20 is supplied to the 17-stage shift register in accordance with the clock pulse 21. Of the 17 outputs from this shift register, the 7th to 12 th outputs are inverted by inverters 24 before entering the AND gate 23 having 17 inputs, and the remaining outputs are directly supplied to the AND gate 23. The AND gate 23 produces "1" only when the output signals 17 from the shift register constitute "11111100000011111" which is the reference waveform pattern of the vertical synchronizing signal in accordance with the NTSC system which is used in the illustrated embodiment. However, for the PAL and SECAM systems, the reference waveform pattern of "11111110000011111" will be used. The output from the AND gate 23 is the vertical synchronizing signal output 19.

Figure 3:
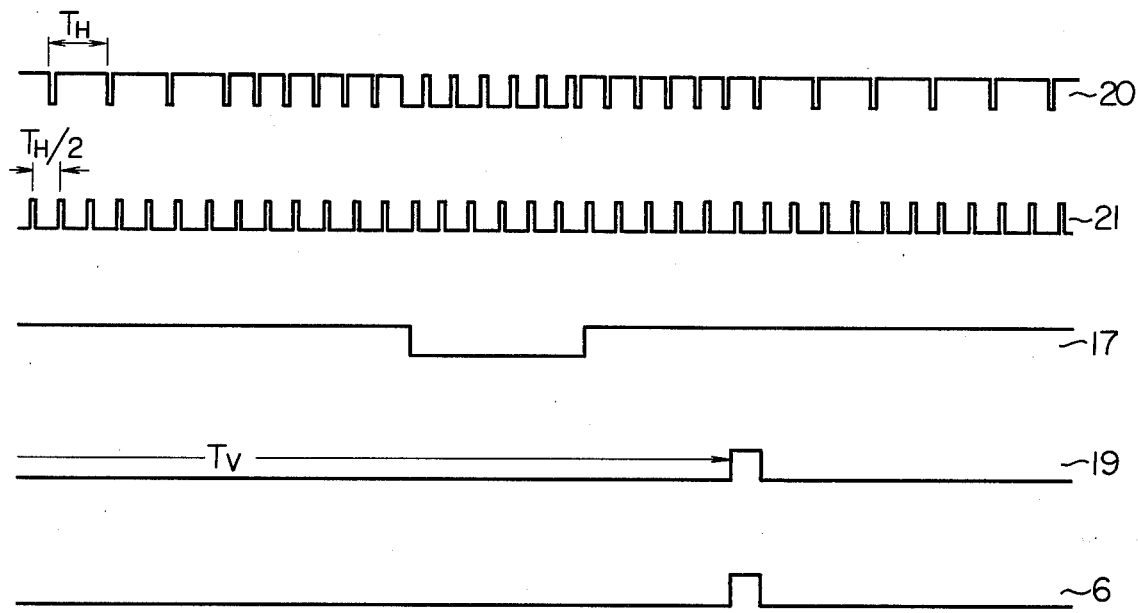
FIG. 3 is a time chart for illustrating the operation of the vertical synchronizing signal extractor circuit shown in FIG. 2.

FIG. 3 is a time chart for explaining the operation of the vertical synchronizing signal extractor circuit shown in FIG. 1. FIG. 3 shows the respective waveforms of the composite synchronizing signal 20, the clock pulse 21, the output signal 17 from the 17-stage shift register 22 with the vertical synchronizing signal supplied, and vertical synchronizing signal output 19 from the vertical synchronizing signal extractor circuit.

Figure 4:
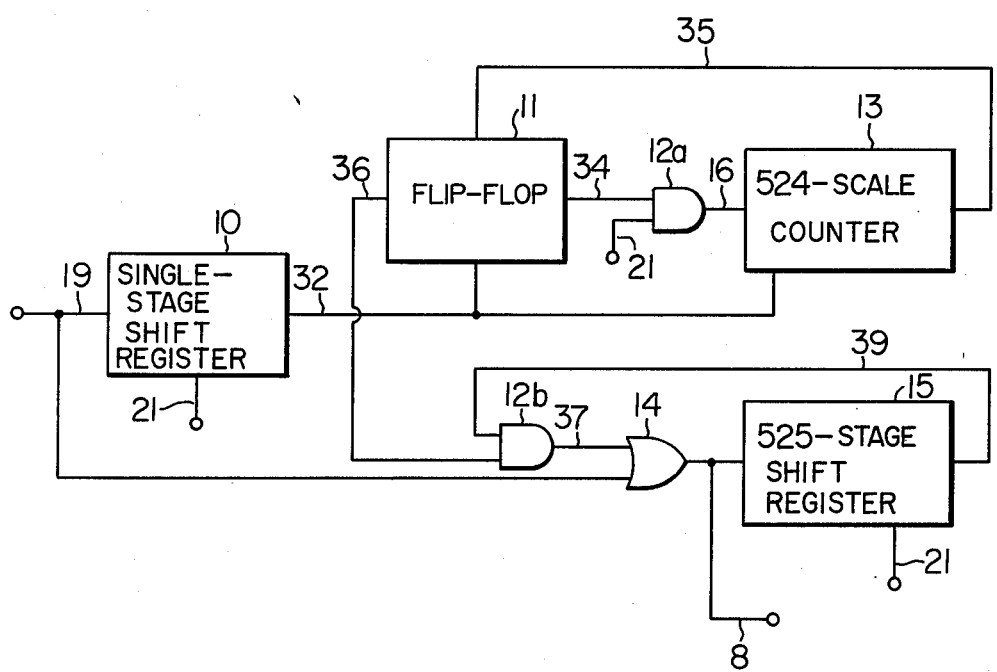
FIG. 4 is a block diagram showing one embodiment of a vertical synchronizing signal compensator circuit according to the present invention.

FIG. 4 is a block diagram showing one embodiment of the vertical synchronizing signal compensator circuit according to the present invention. Referring to FIG. 4, there are provided a single-stage shift register 10, a flip-flop 11, dual input AND gates 12a and 12b, and a 525-stage shift register. The shift register 10 is a single-stage shift register for shifting the vertical synchronizing signal output 19 by one period of the clock pulse 21. The flip-flop 11 is set by the shifted vertical synchronizing signal 32. The AND gate 12a is responsive to the set output 34 from the flip-flop to produce the clock pulse 21. A 524-scale counter 13 counts an output 16 from the AND gate 12a and produces a counter output 35 in response to the 524th count to reset the flip-flop 11. It should be noted that the reset output 36 from the flip-flop 11 in FIG. 3 corresponds to the vertical synchronizing signal delayed by one period. In response to a coincidence of the reset output 36 and the output signal from the 525-stage shift register 15, the dual input AND gate 12b operates to produce an AND gate output 37. In the manner just described above, output components produced due to the abnormality of the clock pulse 21 to the shift register 15 can be eliminated. This operation is performed only when the vertical synchronizing signal output 19 is supplied. A dual input OR gate 14 receives the output 37 from the AND gate 12b and the vertical synchronizing signal output 19. The output 8 from the OR gate 14 is a vertical synchronizing signal pulse as well as an input signal to the shift register 15.

With above-described arrangement, in the presence of the vertical synchronizing signal output 19 the vertical synchronizing signal pulse 8 is directly provided at the output of the circuit 3, while in the absence of the signal output 19 it is provided repeatedly at intervals of 262.5 $T_h$. When the next vertical synchronizing signal output 19 is supplied, it updates the contents of the shift register.

Figure 5:
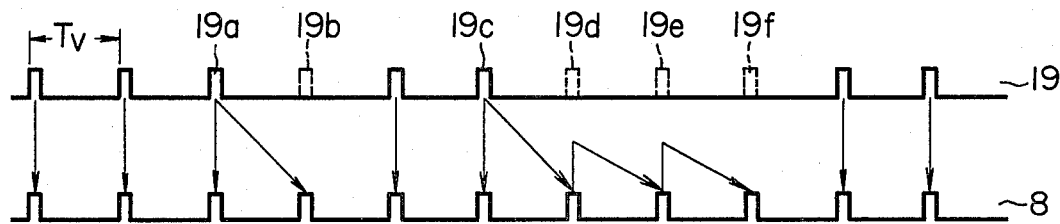
FIG. 5 and FIG. 6 are time charts for illustrating the operation of the vertical synchronizing signal compensator circuit.

FIG. 5 shows waveforms of the vertical synchronizing signal 8 in the absence of the vertical synchronizing signal output 19. In FIG. 5, reference number 19b indicates the situation that the vertical synchronizing signal output 19 is missing by one pulse, and in that situation the immediately preceding vertical synchronizing signal output pulse 19a compensates for the missing portion to provide the vertical synchronizing signal 8 properly. In the case where there is a series of missing portions as indicated by 19d, 19e and 19f, the shift register 15 repeats its recurrent operation to produce the vertical synchronizing signal 8 by utilizing the vertical synchronizing signal output 19c.

Figure 6:
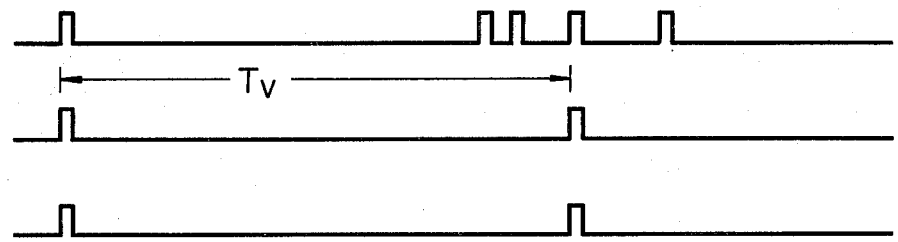

FIG. 6 shows waveforms of pulse outputs appearing at different intervals from the regular period (Tv) because of an erroneous operation of the shift register 15 due to some reasons such as a clock pulse error. In that case, the output signal 39 from the shift register 15 and the reset output 36 from the flip-flop 11 are delivered to the AND gate 12b to obtain a coincidence with each other, so that the output 37 of the AND gate 12b may include pulses of a predetermined period (Tv) only and at the same time the contents of the shift register 15 may include the vertical synchronizing pulse 8 only.

Figure 7:
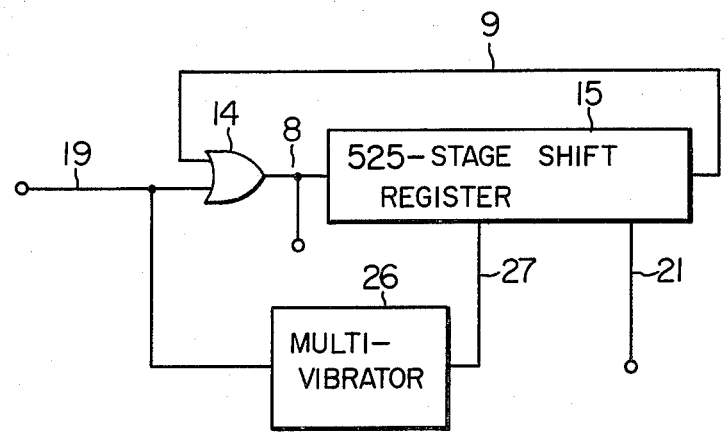
FIG. 7 is a block diagram of another embodiment of the vertical synchronizing signal compensator circuit.

FIG. 7 is a block diagram of another embodiment of the vertical synchronizing signal compensator circuit. The vertical synchronizing signal output 19 is supplied simultaneously to an OR gate 24 and a multivibrator 26 which is, in turn, triggered at the leading edge of the vertical synchronizing signal output 19 to produce an output pulse 27 having a pulse width of 1 microsecond. This output pulse 27 clears the contents of the shift register 15. The shift register 15 receives the output 8 from the OR gate 14. The output 8 from the OR gate 14 is a vertical synchronizing signal. When the vertical synchronizing signal output 19 is missing, the contents of the shift register 15 are not cleared and pass through the OR gate 14 so that a recurrent operation will be repeated until the next vertical synchronizing signal output arrives. It should be noted that the vertical synchronizing signal period Tv is related to the horizontal synchronizing signal period $T_H$ by $Tv=262.5T_H$. Therefore, provided that the shift register 15 has 525 stages and the clock pulse 21 has a period of $T_H/2$ and a phase lag of $T_H/4$, the vertical synchronizing signal 8 during the recurrent operation has the same period as the vertical synchronizing signal included in the composite synchronizing signal.

As described previously, the present invention provides a circuit for preventing the vertical synchronizing signal pulse from appearing at incorrect timing due to such reasons as a drop-out caused by scratches or dust particles on the magnetic tape surface, and this circuit compares the composite synchronizing signal with the reference waveform pattern for the vertical synchronizing signal so as to provide the vertical synchronizing signal pulse only when the comparison results in a complete coincidence. The vertical synchronizing pulse thus obtained is stored in a memory device such as a shift register. If the vertical synchronizing pulse is missing, the signal stored in the memory device is read out and provided as the vertical synchronizing pulse. The vertical synchronizing signal pulse when read out can be given a particular period Tv as well as the same timing as the missing pulse by making the vertical synchronizing pulse period Tv equal to the product of the number N of stages of the memory device and the clock period T.

The length of the vertical synchronizing pulse period Tv varies depending on the jitter and accuracy of the video tape recorder. However, by utilizing either the horizontal synchronizing signal varying similarly to the vertical synchronizing pulse period Tv or a clock pulse proportional to the horizontal synchronizing signal as the clock pulse for the memory device, the vertical synchronizing pulse derived from the signal read out of the memory device can have the same timing as the vertical synchronizing pulse which is missing.

In the illustrated embodiment of the present invention, the vertical synchronizing signal is supplied to the shift register 22 in accordance with the clock pulse 21, and the output signal 17 from the shift register 22 forms a pattern "11111100000011111". That is, the present invention assumes the reference waveform pattern of the vertical synchronizing signal to be "11111100000011111". The timing for the vertical synchronizing signal output 19 can be freely changed by changing the reference waveform pattern as the unit of the period of the clock pulse.

According to the present invention, the vertical synchronizing pulse is provided at correct timing even if a dropout occurs. This may prevent data before and after the vertical synchronizing pulse from missing and maintain the continuity of data, thereby eliminating errors during the error correction.

The present invention is effective in particular for the PCM recording/reproducing system using a video tape recorder. However it is also applicable to other PCM systems effectively.

We claim:

1. A vertical synchronizing signal detector circuit comprising:
    (a) an input terminal for receiving a composite synchronizing signal including a horizontal synchronizing signal and vertical synchronizing signal,
    (b) an output terminal for providing a vertical synchronizing pulse synchronized with the vertical synchronizing signal,
    (c) a clock pulse generator circuit connected to said input terminal and adapted to generate a clock pulse having half the period of the horizontal synchronizing signal and a phase lag therefrom of one-fourth the period thereof,
    (d) a vertical synchronizing signal extractor circuit connected to said input terminal and said clock pulse generator circuit and adapted to compare the vertical synchronizing signal with a reference waveform pattern of the vertical synchronizing signal so as to generate a vertical synchronizing signal output synchronized with the vertical synchronizing signal only when the comparison results in a complete coincidence, and
    (e) a vertical synchronizing signal compensator circuit connected to said vertical synchronizing signal extractor circuit and said clock pulse generator circuit and responsive to the vertical synchronizing signal output to provide this output at said output terminal and simultaneously store the same temporarily, said vertical synchronizing signal compensator circuit being also adapted to provide the stored vertical synchronizing signal output at said output terminal when the vertical synchronizing signal output is not received.

2. A vertical synchronizing signal detector circuit according to claim 1, wherein said vertical synchronizing signal extractor circuit comprises a 17-stage shift register connected to said input terminal and said clock pulse generator circuit, six inverters, and an AND gate for receiving the outputs from the 7th to 12th stages of said shift register through said respective inverters and simultaneously receiving the outputs from the other eleven stages directly so as to produce the logical product of all said outputs from said shift register.

3. A vertical synchronizing signal detector circuit according to claim 1 or 2, wherein said vertical synchronizing signal compensator circuit comprises a single-stage shift register connected to said vertical synchronizing signal extractor circuit and said clock pulse generator circuit and adapted to shift the vertical synchronizing signal output by one period of the clock pulse, a flip-flop adapted to be set by the output from said single-stage shift register, a first AND gate responsive to the set output from said flip-flop to produce a clock pulse, a 524-scale counter, cleared by the output of said single-stage shift register, for counting the output from said first AND gate, a second AND gate adapted to operate in response to the reset output from said flip-flop when said flip-flop is reset by the output of said counter, a first OR gate for producing at said output terminal the logical sum of the output of said second AND gate and the vertical synchronizing signal output, and a 525-stage shift register for receiving the output of said first OR gate and said clock pulse and for supplying the output of said first OR gate to said second AND gate at the time of having received 525 pulses.

4. A vertical synchronizing signal detector circuit according to claim 1 or 2, wherein said vertical synchronizing signal compensator circuit comprises a multivibrator to the vertical synchronizing signal output to produce a trigger pulse, a 525-stage shift register for shifting the vertical synchronizing signal output in accordance with said clock pulse so as to produce an output at the time of having receiving 525 of said clock pulse, said 525-stage shift register being cleared by said trigger pulse, and a second OR gate for producing at said output terminal the logical sum of the output of said 525-stage shift register and the vertical synchronizing signal.

5. A vertical synchronizing signal detector circuit according to claim 1 or 2, wherein said reference waveform pattern for the vertical synchronizing signal in accordance with NTSC system is "11111100000011111".

6. A vertical synchronizing signal detector circuit according to claim 1 or 2, wherein said reference waveform pattern for the vertical synchronizing signal in accordance with PAL and SECAM systems is "1111110000011111".

* * * * *